(12) United States Patent
Bala

(10) Patent No.: US 7,587,668 B2
(45) Date of Patent: Sep. 8, 2009

(54) USING EXISTING CONTENT TO GENERATE ACTIVE CONTENT WIZARD EXECUTABLES FOR EXECUTION OF TASKS

(75) Inventor: Aravind Bala, Redmond, WA (US)

(73) Assignee: Microft Corporation, Redmond, WA (US)

( * ) Notice: Subject to any disclaimer, the term of this patent is extended or adjusted under 35 U.S.C. 154(b) by 683 days.

(21) Appl. No.: 11/060,181

(22) Filed: Feb. 17, 2005

(65) Prior Publication Data

US 2006/0184888 A1   Aug. 17, 2006

(51) Int. Cl.
*G06F 17/00*   (2006.01)

(52) U.S. Cl. .................... 715/234; 715/236

(58) Field of Classification Search ........... 715/255, 715/234, 705, 709, 236; 717/107; 704/10
See application file for complete search history.

(56) References Cited

U.S. PATENT DOCUMENTS

| | | | |
|---|---|---|---|
| 5,201,046 A | | 4/1993 | Goldberg et al. |
| 5,481,667 A | | 1/1996 | Bieniek et al. |
| 5,535,422 A | | 7/1996 | Chiang et al. |
| 5,550,967 A | | 8/1996 | Brewer et al. |
| 5,657,462 A | * | 8/1997 | Brouwer et al. ........... 715/709 |
| 5,715,415 A | | 2/1998 | Dazey et al. |
| 5,825,356 A | | 10/1998 | Habib et al. |
| 5,828,374 A | | 10/1998 | Coleman et al. |
| 5,859,638 A | | 1/1999 | Coleman et al. |
| 5,917,489 A | * | 6/1999 | Thurlow et al. ........... 715/809 |
| 6,064,381 A | * | 5/2000 | Harel ........................ 715/705 |
| 6,104,393 A | * | 8/2000 | Santos-Gomez ............ 715/763 |
| 6,219,047 B1 | | 4/2001 | Bell |
| 6,233,726 B1 | * | 5/2001 | Bowman et al. ............ 717/107 |
| 6,239,800 B1 | | 5/2001 | Mayhew et al. |
| 6,502,102 B1 | * | 12/2002 | Haswell et al. ............. 707/102 |

(Continued)

FOREIGN PATENT DOCUMENTS

EP   1 437 648 A2   7/2004

(Continued)

OTHER PUBLICATIONS

Andrew McGlinchey, Designing Guided Help, 2006, msdn, pp. 1-11 (pdf format).*

(Continued)

*Primary Examiner*—Stephen S Hong
*Assistant Examiner*—Manglesh M Patel
(74) *Attorney, Agent, or Firm*—John D. Veldhuis-Kroeze; Westman, Champlin & Kelly, P.A.

(57) ABSTRACT

A computer implemented method of converting existing content files into an active content wizard executable file is provided, along with systems and tools for doing the same. In the method, an existing content file is converted into a corresponding file in an active content wizard schema. A database of user interface elements corresponding to user interface elements found in one or more windows of an application program to which the existing content file corresponds is accessed in order to retrieve information relating to user interface elements referenced in the corresponding file in the active content wizard schema. Then, an active content wizard file is created from the corresponding file in the active content wizard schema and the retrieved information relating to user interface elements.

12 Claims, 9 Drawing Sheets

U.S. PATENT DOCUMENTS

| | | | | |
|---|---|---|---|---|
| 6,502,234 | B1* | 12/2002 | Gauthier et al. | 717/107 |
| 6,532,023 | B1 | 3/2003 | Schumacher et al. | |
| 6,574,791 | B1* | 6/2003 | Gauthier et al. | 717/107 |
| 7,036,079 | B2 | 4/2006 | McGlinchey et al. | |
| 7,051,317 | B2* | 5/2006 | Vazquez et al. | 717/104 |
| 7,346,846 | B2* | 3/2008 | Rossi et al. | 715/705 |
| 2003/0016238 | A1 | 1/2003 | Sullivan | |
| 2003/0177205 | A1* | 9/2003 | Liang et al. | 709/220 |
| 2004/0130572 | A1 | 7/2004 | Bala | 715/762 |
| 2004/0250214 | A1 | 12/2004 | McGlinchey et al. | 715/762 |
| 2004/0255270 | A1 | 12/2004 | McGlinchey et al. | 717/109 |
| 2004/0261026 | A1 | 12/2004 | Corson | |
| 2004/0268259 | A1 | 12/2004 | Rockey | |
| 2005/0033713 | A1 | 2/2005 | Bala et al. | 706/59 |
| 2005/0114785 | A1 | 5/2005 | Finnigan et al. | |
| 2005/0228644 | A1* | 10/2005 | Wang | 704/10 |
| 2006/0184880 | A1 | 8/2006 | Bala | |
| 2006/0206814 | A1* | 9/2006 | Tonomura et al. | 715/530 |
| 2007/0294413 | A1* | 12/2007 | Luo et al. | 709/227 |

FOREIGN PATENT DOCUMENTS

| | | |
|---|---|---|
| WO | 99/66394 | 12/1999 |

OTHER PUBLICATIONS

U.S. Appl. No. 10/940,479, filed Sep. 14, 2004, entitled "Active Content Wizard Testing".

C.F. Drew, "A Natural Language Interface for Expert System Help Desk", IEEE Conference on Managing Expert System Programs and Projects, pp. 209-215, Sep. 10-12, 1990.

J. Marx et al., "WING: An Intelligent Multimodal Interface for a Materials Information System", 14$^{th}$ Information Retrieval Colloquium, pp. 67-78, Apr. 13-14, 1992.

S. Di Segni, "Goethe: A Natural Language Help System in Prolog an Experiment with the Lexicon Driven Approach", Thirteenth International Conference Artificial Intelligence Expert Systems Natural Language, Avignon, France, vol. 3, pp. 223-232, May 24-28, 1993.

International Search Report dated Mar. 1, 2005 from Application No. PCT/US04/22450, filed Jul. 8, 2004.

European Search Report dated Dec. 6, 2005 from Application No. EP 05 10 7922.

European Search Report dated Dec. 5, 2005 from Application No. EP 03 02 8648, filed Dec. 15, 2003.

European Search Report dated Oct. 18, 2006 from Application No. EP 06 10 0278.

Notice of Allowance dated Jul. 18, 2005 for U.S. Appl. No. 10/887,543, filed Jul. 8, 2004, now U.S. Patent No. 7,036,079.

Supplemental Notice of Allowability dated Oct. 4, 2005 for U.S. Appl. No. 10/887,543, filed Jul. 8, 2004, now U.S. Patent No. 7,036,079.

Office Action dated Aug. 24, 2006 for U.S. Appl. No. 10/337,745, filed Jan. 7, 2003.

"Spreadsheet Formula Highlighting Tool", IBM Technical Disclosure Bulletin, IBM Corp. New York, US, vol. 32, No. 6A, pp. 130-131, Nov. 1, 1989.

"Method for Guiding Users through an Application", Research Disclosure, Mason Publications, Hampshire, CB, No. 350, p. 429, Jun. 1, 1993.

Halsted, et al., K. L., "Eclipse Help System: An Open Source User Assistance Offering", Proceedings of the 20th Annual International Conference on Computer Documentation, pp. 49-59, Oct. 20, 2002.

European Search Report dated Nov. 15, 2006 from Application No. EP 06 100 647, filed Jan. 20, 2006.

Myllymarki, J., "Effective Web data extraction with standard XML technologies", Computer Networks, Elsevier Science, B. V., vol. 39, No. 5, pp. 635-644, Aug. 5, 2002.

"WinRunner User's Guide", Version 7.6, Mercury Interactive, Chapters 3-6, pp. 25-74, Jan. 2004, retrieved from Internet URL: http://qualityvista.com/winrunner-guides.html on Sep. 24, 2006.

* cited by examiner

USING EXISTING CONTENT TO GENERATE ACTIVE CONTENT WIZARD EXECUTABLES FOR EXECUTION OF TASKS

CROSS-REFERENCE TO RELATED APPLICATIONS

Reference is hereby made to the following co-pending and commonly assigned patent applications: U.S. application Ser. No. 10/337,745, filed Jan. 7, 2003, entitled "ACTIVE CONTENT WIZARD: EXECUTION OF TASKS AND STRUCTURED CONTENT" which was published on Jul. 8, 2004 as Publication No. US 2004/0130572 A1; U.S. application Ser. No. 10/887,058, filed Jul. 8, 2004, entitled "AUTOMATIC TEXT GENERATION" which was published on Feb. 10, 2005 as Publication No. US 2005/0033713 A1; U.S. application Ser. No. 10/940,479, filed Sep. 14, 2004, entitled "ACTIVE CONTENT WIZARD TESTING"; U.S. application Ser. No. 10/887,543, filed Jul. 8, 2004, entitled "IMPORTATION OF AUTOMATICALLY GENERATED CONTENT" which was published on Dec. 16, 2004 as Publication No. US 2004/0255270 A1; U.S. application Ser. No. 10/887,414, filed Jul. 8, 2004, entitled "AUTOMATIC IMAGE CAPTURE FOR GENERATING CONTENT" which was published on Dec. 9, 2004 as Publication No. US 2004/0250214 A1; U.S. application Ser. No. 11/059,737, filed Feb. 17, 2005, entitled "DISCOVERABILITY OF TASKS USING ACTIVE CONTENT WIZARDS AND HELP FILES—THE WHAT CAN I DO NOW? FEATURE", all of which are hereby incorporated by reference in their entirety.

BACKGROUND OF THE INVENTION

The present invention relates to generating content, such as help content. More specifically, the present invention relates to methods of using existing content, such as help files, to generate Active Content Wizard (ACW) executable files.

The Graphical User Interface (GUI) is a widely used interface mechanism. GUI's are very good for positioning tasks (e.g. resizing a rectangle), visual modifier tasks (e.g. making something an indescribable shade of blue) or selection tasks (e.g. this is the one of a hundred pictures I want rotated). The GUI is also good for speedy access to quick single step features. An application's GUI is a useful toolbox that is organized from a functional perspective (e.g. organized into menus, toolbars, etc) rather than a task oriented perspective (e.g. organized by higher level tasks that users want to do, such as "make my computer secure against hackers").

However, GUIs present many problems to the user as well. Using the toolbox analogy, a user has difficulty finding the tools in the box or figuring out how to use the tools to complete a task composed of multiple steps. An interface described by single words, tiny buttons and tabs forced into an opaque hierarchy does not lend itself to the way people think about their tasks. The GUI requires the user to decompose the tasks in order to determine what elements are necessary to accomplish the task. This requirement leads to complexity. Aside from complexity, it takes time to assemble GUI elements (i.e. menu clicks, dialog clicks, etc). This can be inefficient and time consuming even for expert users.

One existing mechanism for addressing GUI problems is a written help procedure. Help procedures often take the form of Help documents, PSS (Product support services) KB (Knowledge base) articles, and newsgroup posts, which fill the gap between customer needs and GUI problems. They are analogous to the manual that comes with the toolbox, and have many benefits. These benefits include, by way of example:

1) Technically speaking, they are relatively easy to author even for non-technical authors;
2) They are easy to update on a server so connected users have easy access to new content; and
3) They teach the GUI thereby putting users in control of solving problems.

However, Help documents, PSS KB articles and newsgroups have their own set of problems. These problems include, by way of example:

1) Complex tasks require a great deal of processing on the user's part. The user needs to do the mapping from what is said in each step to the GUI. This can lead to errors in that steps are skipped, described incorrectly or inadequately or are described out of order.
2) Troubleshooters, and even procedural help documents, often include state information that creates complex branches within the help topic, making topics long and hard to read and process by the end user. Toolbars may be missing, and may need to be turned on before the next step can be taken. Troubleshooters often ask questions about a state that is at best frustrating (because the troubleshooter should be able to find the answer itself) and at worst unanswerable by non-experts.
3) There are millions of documents, and searching for answers involves both a problem of where to start the search, and then how to pick the best search result from the thousands returned.
4) There is no shared authoring structure. Newsgroup posts, KB articles, troubleshooters and procedural Help documents all have different structures and authoring strategies, yet they are all solving similar problems.
5) For a user, it is simply difficult to read step-by-step text, and then visually search the UI for the element being described and take the action described with respect to that element.

Another existing mechanism for addressing GUI problems is a Wizard. Wizards were created to address the weaknesses of GUI and written help procedures. There are now thousands of wizards, and these wizards can be found in almost every software product that is manufactured. This is because wizards solve a real need currently not addressed by existing text based help and assistance. They allow users to access functionality in a task-oriented way and can assemble the GUI or tools automatically. Wizards allow a program manager and developer a means for addressing customer tasks. They are like the expert in the box stepping the user through the necessary steps for task success. Some wizards help customers setup a system (e.g. Setup Wizards), some wizards include content with features and help customers create content (e.g. Newsletter Wizards or PowerPoint's AutoContent Wizard), and some wizards help customers diagnose and solve problems (e.g. Troubleshooters).

Wizards provide many benefits to the user. Some of the benefits of wizards are that:

1) Wizards can embody the notion of a "task." It is usually clear to the user what the wizard is helping them accomplish. With step-by-step pages, it can be easy for a user to make choices, and in the case of well designed wizards the incidence of the user becoming visually overwhelmed is often reduced.
2) Wizards can automatically assemble and interact with the underlying features of the software and include the information or expertise needed for customers to make choices. This saves the user time in executing the task.

3) Wizards can automatically generate content and can save users time by creating text and planning layout.

4) Wizards are also a good means for asking questions, getting responses and branching to the most relevant next question or feature.

However, wizards too, have their own set problems. Some of these problems include, there are many more tasks that people try to accomplish than there are wizards for accomplishing them. Wizards and IUI (Inductive User Interfaces) do not teach customers how to use underlying GUI and often when the Wizard is completed, users are unsure of where to go next. The cost of authoring of wizards is still high and requires personnel with technical expertise (e.g. software developers) to author the Wizard.

Further, all of these types of content suffer from yet another problem. The steps that must be taken to perform any given task may change based on the configuration of the computer on which the task is to be performed. For instance, changing the background display (or "wallpaper") on a computer may require the user to perform different steps, depending on the operating system of the user's computer. In fact, the steps required may even be different if the version number of the operating system is different. Similarly, the steps may be different depending on the network configuration of the computer (e.g., depending on whether the computer is on a network domain or on a workgroup). This requires the user to author fairly complicated branching logic in the written content.

Thus, authoring all of these types of content that describe procedures to be taken by a user, is often error prone. It is quite easy to miss steps, to describe steps incorrectly, or to lose track of what step is currently being described in a long sequence of UI manipulations. However, this written procedural help content is extremely common. Such help content often ships with products, on-line help content is provided for product support teams, and procedures inside companies are often documented in this way for specific business processes. Thus, this type of information is difficult to author and often contains errors.

In addition, end users must typically follow the steps that have been authored. It can be difficult to read step-by-step text, and then search the UI for the particular control element being described and then to take the proper action with respect to that control element. It has been found that many users find this such a burden that they simply scan the first one or two steps of the text, and then try their best to determine which UI elements need to be actuated next, barely referring back to the written text steps. It has also been found that the eye can find and recognize pictures much more easily than it can read a word, mentally convert the word into a picture, and then find the corresponding UI control element. Yet, in the past, this is exactly what was done, as an author must painstakingly take screenshots of each step, crop the images, and paste them into a document in the right place, in order to have any type of visual depiction of an action to be taken.

Active Content Wizards (ACW's) address these issues by allowing authors to generate specific steps and descriptions thereof with relative ease. Authors simply interact with a user interface, while a recording component records the author's actions. This allows ACW's to be easily created for a vast array of situations. ACW's generally include code, in one form or another, to interact with the user interface, to essentially play a help topic for a user directly to the user interface. Thus, while an ACW is interacting with the user interface, the ACW will also provide a description to the user regarding the interaction. During playback, the ACW may allow the user to interact with the user interface to enter specific information, such as a filename, etc.

As noted, GUI applications today often ship with a number of procedural Help topics that let the user know how to perform a task using the GUI. Given the vast array of tasks that a user may need help with, there are large numbers of procedural Help files or documents, PSS KB articles, and the like which have been written to aid users of software programs. Many of these would be very good candidates for ACW's. However, it would not be economical to re-write those topics as ACW's, especially if there are thousands of them like in Windows or Office.

The present invention provides solutions to one or more of the above-described problems and/or provides other advantages over the prior art.

SUMMARY OF THE INVENTION

A computer implemented method of converting existing content files into an active content wizard executable file is provided, along with systems and tools for doing the same. In the method, an existing content file is converted into an existing content file in an active content wizard schema. A database of user interface elements corresponding to user interface elements found in one or more windows of an application program to which the existing content file corresponds is accessed in order to retrieve information relating to user interface elements referenced in the existing content file in the active content wizard schema. Then, an active content wizard file is created from the existing content file in the active content wizard schema and the retrieved information relating to user interface elements.

Other features and benefits that characterize embodiments of the present invention will be apparent upon reading the following detailed description and review of the associated drawings.

DETAILED DESCRIPTION OF ILLUSTRATIVE EMBODIMENTS

The present invention includes methods of, and a set of tools for, converting existing procedural help topics, KB articles, and similar content documents into Active Content Wizard (ACW) scripts. Prior to describing the present invention in greater detail, one exemplary environment in which the invention can be used will be discussed.

I. Exemplary Environment

Figure 1:
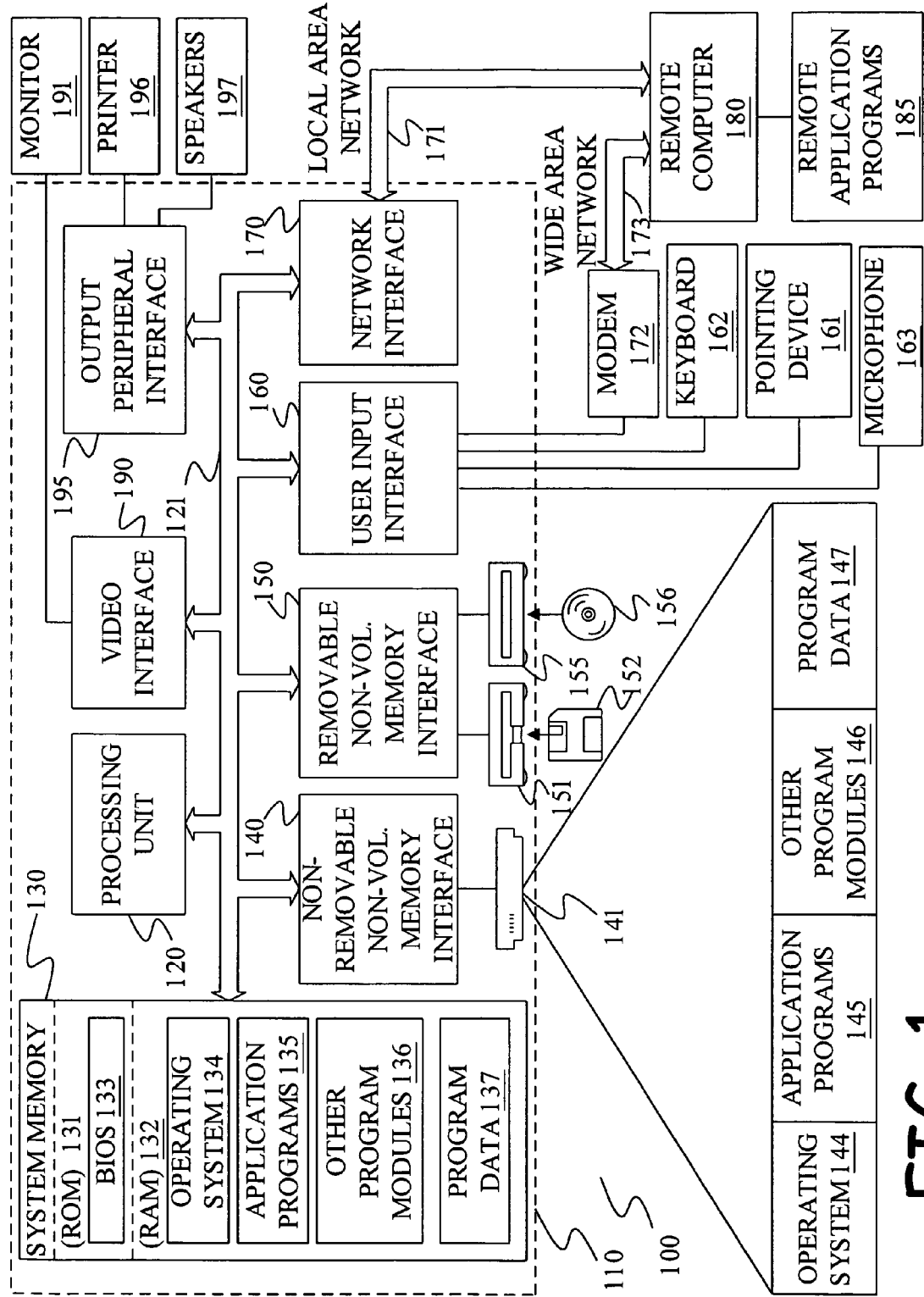
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. General ACW Authoring System

An example of ACW formats, generation methods, and execution methods can be found in the previously referenced United States Patent Application entitled Active Content Wizard Execution of Tasks and Structured Content, which was published on Jul. 8, 2004 as Publication No. US 2004/0130572 A1. For purposes of better understanding ACW's and ACW authoring, a description of an ACW authoring system is provided with reference to FIGS. 2-4.

Figure 2:
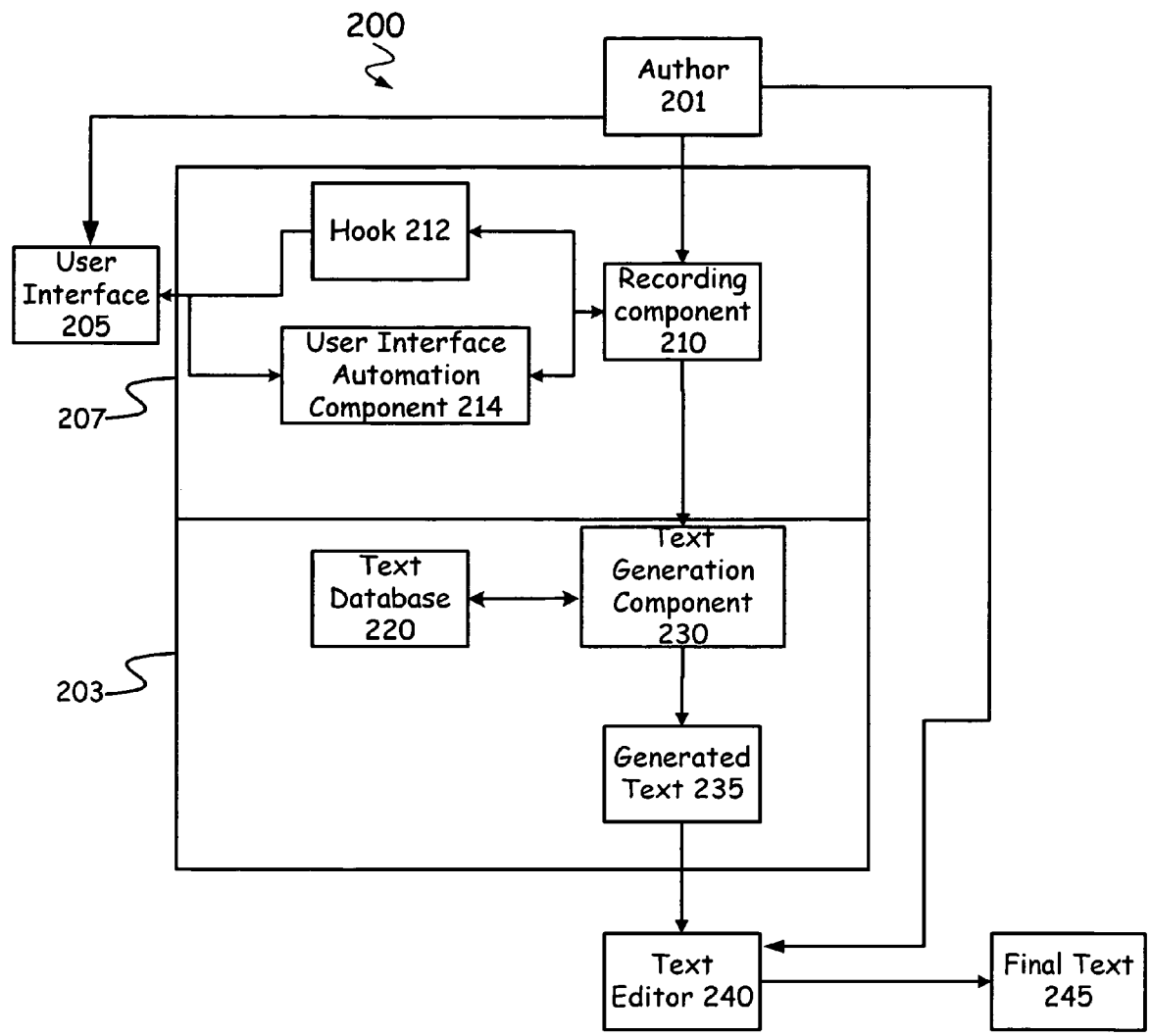
FIG. 2 is a block diagram illustrating the components of an ACW authoring system.

FIG. 2 is a block diagram illustrating the components of an ACW authoring system 200 in accordance with an example embodiment. FIG. 2 also shows system 200 with recorder 207 and automatic text generator 203. The recorder 207 includes a recording component 210, a hook component 212, and a user interface (UI) automation component 214. The text generator 203 includes a text database (or data store) 220, and text generation component 230. The system 200 interacts with a user interface 205. An author 201 can configure the components of system 200 to automatically record images corresponding to actions performed on the controls of user interface 205, and text generator 203 automatically generates text 235 that describes those actions. Author 201 can also edit the automatically generated text 235 or generate text from scratch on editor 240 to obtain final text 245 describing the task (or UI control actions). Final text 245 can also illustratively include the images embedded therein. A number of the components in FIG. 2 will now be described in greater detail.

User Interface 205 is, in one embodiment, a conventional graphical user interface with controls that allow a user to take actions to perform a task. The user interface 205 is illustratively displayed on display device 191 shown in FIG. 1. This type of graphical user interface (GUI) is a widely used interface mechanism.

Recording component 210 is in one embodiment an application program that allows the author 201, or another user, to perform a task on the user interface 205, and records the tasks by capturing images of each step in the task. As is described in more detail below, while the author 201 is performing the steps associated with the task on the user interface 205, the recording component 210 records information about what controls and windows the author interacts with on the user interface 205. This information is optionally provided to the text generator 230 to automatically generate the text in a document, such as a help document. Manual generation of the text by the user can also be employed.

The recording component 210 interacts with the user interface 205 through the hook 212 and the user interface (UI) automation component 214. These components can be separate from the recording component 210, or in some embodiments these components can be integral with the recording component 210.

The hook component 212 is, in one embodiment, a module or component within an operating system that is used by the computer. When a hook is set for mouse clicks, for example, information indicative of the mouse click (such as a message) is forwarded to the hook component 212 where it is consumed, and after its associated control identifying information and images have been recorded by the recording component 210, it is played back for other components in the computer that have registered to receive mouse clicks. Therefore, generally, the hook component 212 acts as a buffer between the operating system and the target application. The hook component 212 can be configured to look for substantially any input action, such as the type of signal received, e.g. single click, double click, right or left click, keyboard action, touch-sensitive screen input, etc. Once the information representing the action and screen shot image indicative of the action is recorded by the recording component 210, the information representing the mouse click (or whatever action recorded) is then played back by the hook component 212 to the application. One reason for this is that the user may take a second action before the first action is recorded. The second action may well cause the state of the user interface to change, and thus result in improper recording of the first action. For example, if the action being recorded is clicking a menu item, the click will make the menu item disappear. Therefore, the image is captured before the mouse click is passed to the application. By consuming the first mouse message and playing it back once recording is complete, this ensures that the first action will be recorded properly.

It should also be noted that the functions performed by the hook component 212 (i.e., listening for mouse clicks and playing them back) are illustratively performed on separate threads. This ensures that all user interface actions (e.g., mouse clicks, keyboard actions etc.) will be properly recorded and played back without missing any. Further, the record and playback mechanism of hook component 212 can override any timeout features that are implicit within the operating system. This can be necessary if the timeout period of the operating system is too short to allow for proper recording of the action and capturing of the image indicative of the action. For instance, capturing an image may take 300-400 ms or so, and even up to a second if the entire desktop is being captured. Thus, overriding the timeout and operating on multiple threads are helpful.

User interface automation component 214 is illustratively a computer program configured to interpret the atomic steps for the overall task performed by the author or user through the user interface 205. In one embodiment, user interface automation component 214 is a GUI automation module implemented using Microsoft User Interface Automation by Microsoft Corporation of Redmond, Wash. This module provides a programmatic way to access information about the visible user interface, and to programmatically interact with the visible user interface. However, depending on the system setup, the user interface automation component 214 can be implemented using any application that is able to programmatically navigate a graphical user interface and to detect (and optionally programmatically navigate the GUI to perform and execute) commands on the user interface.

User interface automation component 214 thus detects each of the steps associated with the desired task performed on the user interface 205 by author 201 (or another user) in task order. For instance, when the task requires the user to click a button on the GUI to display a new menu or window, user interface automation component 214 determines which control is located at the position of the mouse cursor on user interface 205 and its size and its parent window. The recording component 210 uses information from hook component 212 (e.g., the type, name and state of the control) to record the name and properties of the control that was used to perform the step. This information is provided from the user interface automation component 214 and hook component 212 to the recording component 210 such that the recording component 210 can record the control identifying information and image of the button or the control that was used by the author to perform the step. Obtaining the image is described in greater detail below with respect to FIG. 3.

Text generation component 230 is a program or module configured to generate natural language text that describes the actions executed or performed during the recording process. The text generation component 230 uses the recorded images and other information recorded by the recording component 210 to search database 220 and to choose a correct template or entry from the text database 220 that corresponds to the recorded step.

Text database 220 is illustratively a database or other information storage system that is searchable by the text generator 230. Text database 220 contains information related to the controls that are available on the user interface 205. This information can include, for example, the name of the control, the type of control, the action performed on the control, and a textual description of the action as a natural language sentence.

In some embodiments the textual description for the entry is provided in multiple languages. When the textual description is provided in multiple languages, a language identifier is provided with each entry that allows the correct language to be selected.

However, depending on the needs of the system, other information can be provided in the text database 220. In one embodiment, some entries in the text database 220 have information related to two or more actions exemplified by multiple controls that are performed in sequence. Where multiple actions on multiple controls are represented by a single entry in the text database 220 the text for the entry contains natural language descriptions of the action performed on both controls as a single sentence. By combining the description of the two commands as a single sentence, the readability of the final text document is improved.

In one embodiment, the text database 220 is written in Extensible Markup Language (XML). The data for each entry can be stored as a series of subentries, where each subentry of the entry refers to an individual piece of information that is needed to identify the task. However, other formats can be used for storing the data.

In one embodiment, the text generation component 230 looks at two or more of the recorded actions when searching for entries in the text database 220. This can be done in order to provide a more fluid text document. For instance, good procedural documentation often combines more than one step into a single sentence as an enhancement to readability. If the text generation component 230 identifies two or more that match the recorded information in the text database 220, the text generation component 230 can use any known method to determine which entry in the database to choose, such as by disambiguating the entries based on scoring each entry, and selecting the entry that has the highest score.

According to one embodiment, based on the type of the control actuated on the user interface, and the performed action, the text generation component 230 searches the text database 220 for an entry that matches the executed control type and action. Once a match is identified in the text database 220, the text generation component 230 obtains the associated natural language description of the action from the text database 220, and places it as a sentence instruction in the generated text document 235. In an alternative embodiment, the text generation component 220 can also generate an executable version of the text document based on the information provided by the UI automation module 214.

When choosing a textual description from the text database 235, the text generation component can also look to the state of the control. This is important when the control is a checkbox or an expandable or collapsible tree. In this case merely clicking on the box may not be appropriate to describe the action, as the action on the control is the same regardless of the desired result. Therefore, in these cases, the new state of the control will influence the selected text. For example, if the control is a check box and it is to be deselected, the text matched would be based on the new state of the control plus the control's name.

Text editor 240 is an editor configured to correct, change, or add information or text to the automatically generated text 235. Depending on the resultant text generated by text generator 230, and the actions performed by the author, it may be necessary to edit the text to further enhance its understandability. Therefore, text editor 240 receives the generated text 235, and allows the author 201 to edit the generated text.

Text editing may be required, for example, because of a grammatical necessity or because one of the recorded steps required a user action, and the system did not request the description of the user action at the time it was recorded. In such a case (when a user input is required), while performing the task to be recorded according to one embodiment, the text generator 235 only provides a space in the text for the author to provide an instruction/description of what the user should do at this step.

For example, assume that the task being performed by the user and recorded by the recording component is to change the background paneling on the computers screen. This requires the user to choose a pattern for the background. Therefore, the text that is returned by the text database for a recorded user action to change the background can be "Please select [insert description of action]", where the author will have to edit the text to read "Please select the desired background from the list." Also during the editing stage the author 201 can provide a description of the overall task if this was not provided prior to recording the task. Once the text has been edited the final text 245 is output from the authoring tool 200 and is stored in an appropriate storage mode that allows for the final text to be retrieved by a user when desired.

Figure 3:
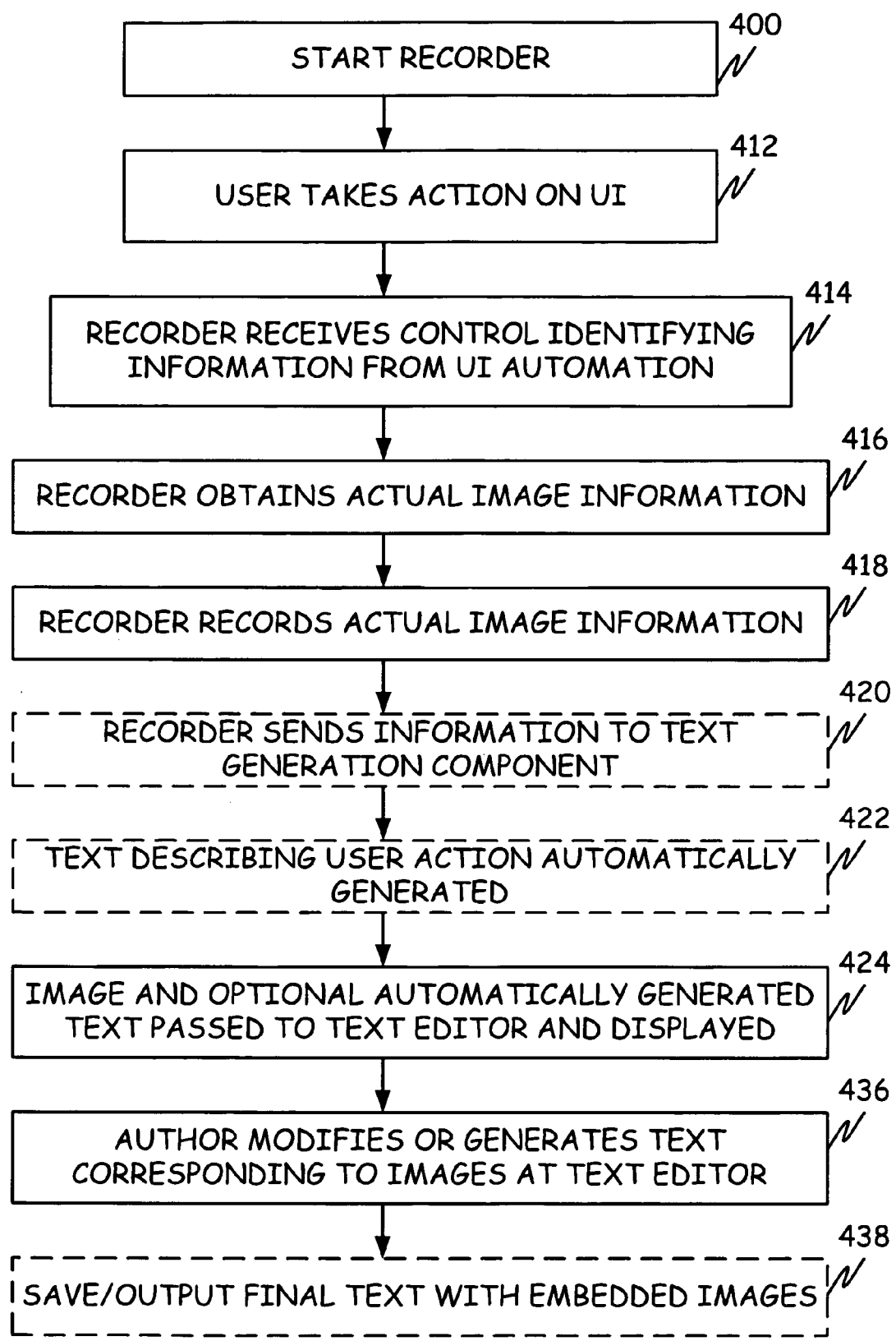
FIG. 3 is a flow diagram illustrating the operation of the system shown in FIG. 2.
Figure 4:
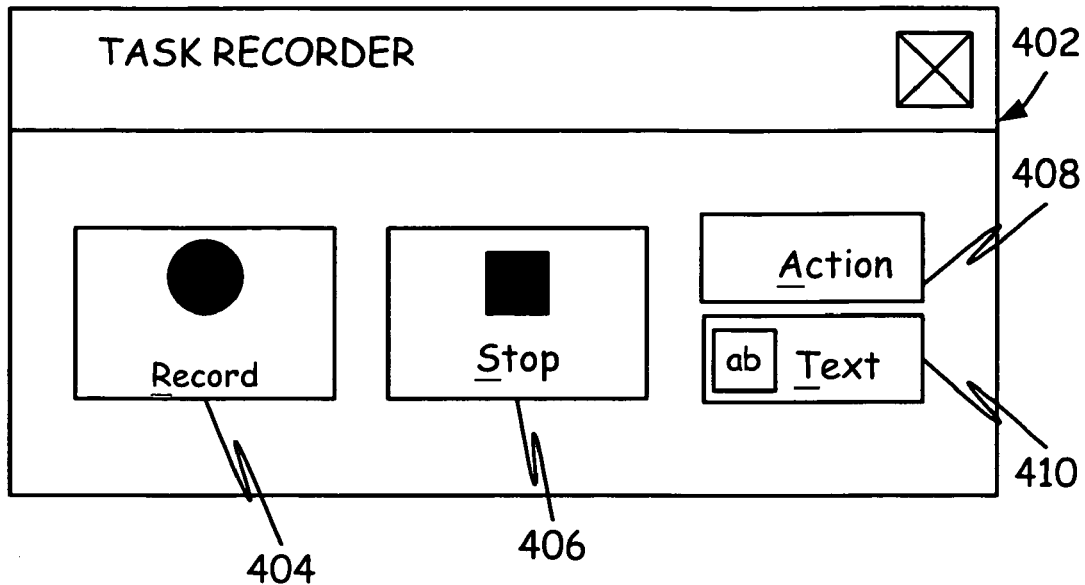
FIG. 4 is a diagrammatic illustration of a control for a task recording component.

FIG. 3 is a flow diagram illustrating how system 200 operates in greater detail, in accordance with one example embodiment. First, author 201 starts recording component 210. This is indicated by block 400 in FIG. 3. In order to do this, author 201 simply actuates a control, such as control 402 shown in FIG. 4. Record button 404 can be actuated by author 201 in order to begin recording. Stop button 406 is actuated to stop recording. As will be described below, author 201, can insert a description of user actions during text editing in text editor 240. In order to do this, the user actuates button 408. Similarly, as described below, author 201 can edit automatically generated text. This can be done by actuating text button 410 in FIG. 4. Additionally, in some embodiments, an additional button can be provided to allow the user to set a value.

This is to allow correct text to be generated in instances when, for instance, at runtime, the user may be required to type a text into an edit box. Of course, other or different controls can be used as well.

Referring again to FIG. 3, once author 201 has started recording component 210, the system simply waits for a user to take an action on user interface 205. It will be noted that FIG. 2 shows that the user is author 201, but the user could be a different user as well.

Once the user has taken an action on user interface 205 (such as by manipulating a control element on the user interface) hook component 212 receives a message or other signal indicative of the user action. As discussed above, with respect to hook component 212, hook component 212 consumes the message and places it on a queue for recording. The user taking an action on UI 205 is indicated by block 412 in FIG. 3.

Recording component 210 then receives control identifying information from UI automation component 214. This is indicated by block 414 in FIG. 3. In one illustrative embodiment, UI automation component 214 provides recording component 210 with a number of items of information that allow recording component 210 to record the control identifier on the display screen which represents, or corresponds to, the action taken by the user at user interface 205. In one illustrative embodiment, these items of information are the position of the control element on the display screen that the user has actuated or otherwise manipulated, the bounding rectangle or size of that control element, and the parent window that contains the control element. In exemplary embodiments, the image of the control is not used in playback. It is only recorded to make it understandable by authors.

Recording component 210 then obtains actual image information indicative of the screen shots associated with the user interface 205 and corresponding to, or reflecting, the action taken by the user. This is indicated by block 416 in FIG. 3.

In order to perform this step, recording component 210 can do a number of things in order to enhance the operation of the system. For instance, recording component 210 may determine that it would be helpful to record actual image information (or the actual screen shot) of more than just the control element manipulated by the user. This may be true, for example, if there is more than one similar control element currently on the display being manipulated by the user. Assume, for instance, that the user has clicked an "OK button" on the user interface. However, there may be more than one "OK button" on the display screen at that time. Therefore, in order to disambiguate among the various "OK buttons", recording component 210 may obtain the actual screen shot information for not only the particular "OK button" manipulated by the user, but for a desired number of pixels around that "OK button". This provides an image with greater context than simply an image of the control itself.

Similarly, recording component 210 may also record the screen shot image of the entire parent window that contains the control element. Of course, this contains a great deal of extra context which can be used to specifically identify the control element that the user has manipulated.

In order to determine whether additional context needs to be recorded by recording component 210, recording component 210 can make this determination using any of a wide variety of different techniques. For instance, recording component 210 can deploy heuristics that will identify an amount of context for recording. The heuristics may be based on the size and shape of the control element manipulated, the particular function of the control element manipulated, the type of control element (e.g., checkbox, textbox, treeview) the position of the control element on the screen (for instance, if the control element is in the upper left hand corner recording component 210 may take more pixels on the lower and right hand sides of the control element), or the heuristic can simply reflect a fixed number of pixels which are to be taken around the control element, regardless of where it is located and what functions are performed by the control element.

Recording component 210 can obtain the actual screen shot image information using any known technique. For example, in most operating systems, there are published application programming interfaces (APIs) that allow an application or other computing component to obtain a bitmap screen shot of any section of the screen as currently being displayed. Therefore, in one illustrative embodiment, recording component 210 simply makes an API call to obtain the information, once it knows the coordinates of the screenshot image information it desires, and the amount of context information and optionally the parent window of the control element.

Having obtained the control identifying information, recording component 210 records it for later use. Depending on how it will be used, recording component 210 may compress or resize the image using standard image manipulation APIs. This reduces the memory required and the size of the final document. This is indicated by block 418 in FIG. 3. Of course, it will also be noted at this point that recording component 210 can record other information provided by UI automation component 214. For instance, UI automation component 214 illustratively provides recording component 210 with the control name, the control type, the action performed on the control, the type of manipulation performed (such as mouse click, mouse wheel rotation, keyboard keystrokes, touch pad input, etc.). This information can all be recorded by recording component 210.

In accordance with one example embodiment, text generation component 230, in conjunction with text database 220, automatically generates text associated with the images and control identifying information captured, and associated with the action taken by the user on user interface 205. In the embodiment in which these items are used, recording component 210 sends the information captured (such as click type, control type, control name, etc.) to text generation component 230. This is indicated by optional block 420 in FIG. 3. The automatically generated text illustratively provides a written procedure which corresponds to step by step instructions for each user manipulation of user interface 205 in order to perform an overall task that requires multiple manipulations of user interface 205.

In order to generate this text, text generation component 230 can use any suitable method. In one illustrative method, text generation component 230 searches text data store 220 for entries that correspond to the information received from recording component 210. For instance, text data store 220 may illustratively be an XML database containing a plurality of entries that include the type of control or other item manipulated by the user on user interface 205, the type of action, and a text corresponding to that action. Of course, other data storage methods can be used to implement data store 220, and data store 220 can contain additional or different information as well.

For example, assume that the information received from the recording component 210 indicates that the user has clicked on (or otherwise invoked) an "OK button". Then, text generation component 230 searches text data store 220 for an entry that matches this type of action. Once a match is found, text generation component 230 retrieves the text from that entry in text data store 220 that describes that type of action. The text may, for instance, simply say "click OK".

In any case, text generation component 230 illustratively and optionally automatically generates text describing the user action taken on user interface 205 and recorded by recording component 210. This is indicated by block 422 in FIG. 3.

The generated text is indicated by block 235 in FIG. 2. In one illustrative embodiment, the images recorded by recording component 210 are automatically embedded in the generated text 235, or are at least associated with the generated text 235 such that they can be recalled and displayed in conjunction with one another later in the process.

Next, the image data recorded by recording component 210 and the optional automatically generated text is provided to editor component 240. The images recorded by recording component 210 and automatically generated text are illustratively displayed on a display screen at editor 240 such that author 201 can generate text corresponding to those images. Displaying of the images and optionally the text generated by generation component 230 is indicated by block 424 in FIG. 3.

Once displayed, the author can then enter text or modify text, as desired, in order to obtain a full description of the step performed by the user at user interface 205. Modifying or generating text corresponding to the images using text editor 240 is indicated by block 436 in FIG. 4. The final text 245 with embedded images is then saved, as is indicated by the optional block 438 in FIG. 4. However, it is not necessary in all embodiments that images be embedded in text. For example, the authoring system can simply be used to display the captured images to an author, where the author is generating a written description of the steps taken and for which images are captured.

III. Using Existing Content to Generate ACW Executables

As discussed previously, given the thousands of pre-existing help files or documents, PSS KB articles and other help content which are available, it is labor intensive to use the above-described methods to author corresponding ACW's for each of them individually. The methods, systems and tools of the present invention provide mechanisms for converting these thousands of pre-existing help content files or documents into ACW's. In some cases the conversion can result in an ACW that completely and accurately reflects the steps or instructions of the corresponding original help content file. In other cases, the conversion results in an ACW that is substantially complete and accurate, which with the use of the previously described authoring tools can be edited to complete the process. For example, if the present invention provides 80% accuracy in the conversion process, the resulting ACW can be edited to achieve complete accuracy in far less time than might be required to author the same ACW from scratch.

Figure 5:
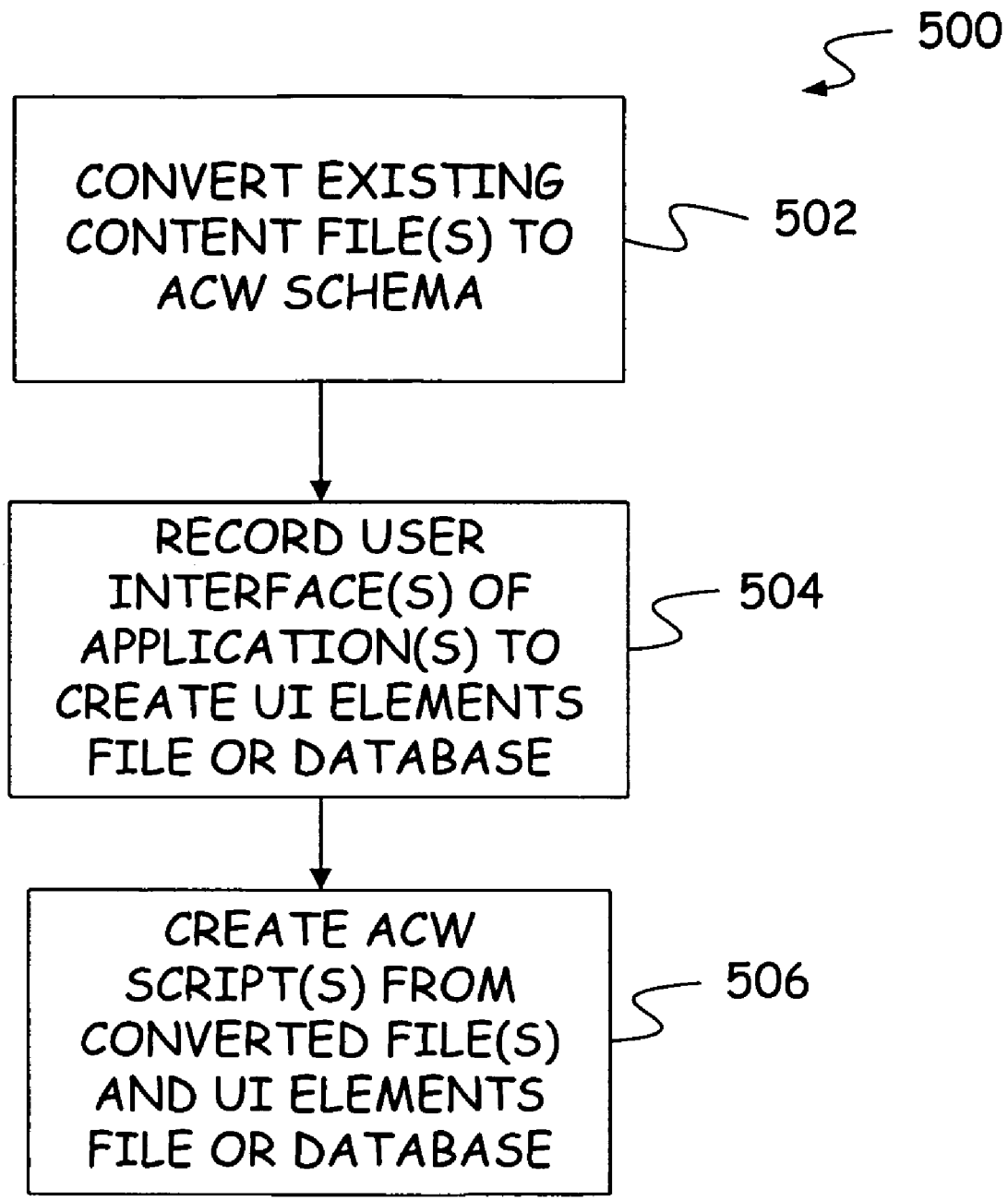
FIG. 5 is a flow diagram illustrating a method of converting existing help content to an ACW executable format in accordance with an embodiment of the present invention.
Figure 6:
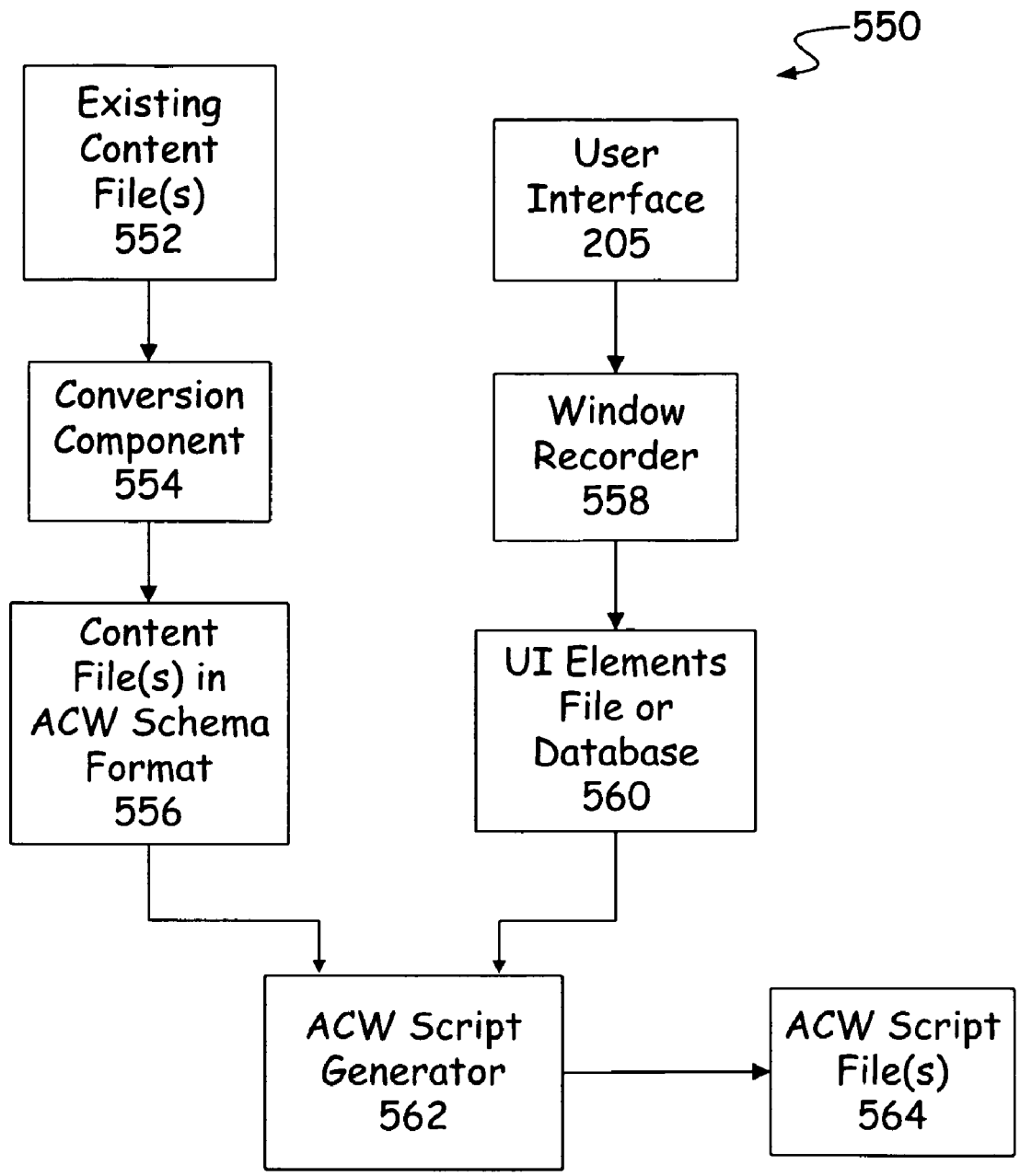
FIG. 6 is a block diagram illustrating a conversion system in accordance with an embodiment of the present invention.

Referring now to FIG. 5, shown is a method 500 which creates ACW'S from existing content files. FIG. 6 illustrates a system 550 which can be used to implement the method, or which can other wise be used to perform some or all of the ACW creating process. First, as shown at block 502 of FIG. 5, the method includes the step of converting existing content files (552 in FIG. 6) into an ACW Schema format (556 in FIG. 6). This can be done with a conversion component 554 which performs the conversion in one or more steps using maps, style sheets, and/or other techniques.

In some embodiments, Active Content Wizards are stored in an XML format, such as the XML format which is a part of the Microsoft Assistance markup language (MAML). Other XML formats can also be used for the ACW schema. Since many help files and other similar content are created using HTML or XML formats, this step can include converting the existing content files from an HTML schema to an ACW XML schema, or from a non-ACW XML schema to an ACW XML schema. Even if the legacy help content files are in other formats, it is usually very easy to convert them to an HTML format first, as part of a multi-step conversion process.

If the existing content format is XML, then the conversion step(s) can use an XSLT style sheet, or a map or program can be defined to transform the content. The style sheet depends on the XML schema used by the source application.

If the existing format is HTML, it is harder to write a transform as HTML is a style based format and does not provide schematic information that is required in the MAML format. However, a number of heuristics can be used to aid in the transformation. Though these heuristics are dependent of the format of the content, they tend to work reasonably well—in the case of Microsoft Windows/Microsoft Office HTML help, they work to 85%-90% accuracy as the Help content tends to be very well structured. For most applications, the Help content is written using a rigid style guideline. For example, in both Windows and Office Help, a numbered list correlates to a procedural Help topic. An example of some of the heuristics that can be used in the transformation process for Windows and Office Help include:

1. The title element corresponds to the Title element in MAML or other ACW XMLs.
2. The numbered list corresponds to the taskProcedure element in MAML or other ACW XMLs.
3. Each item in the numbered list corresponds to a step in the procedure.
4. Text that appears on the UI are indicated by <b> tag in HTML. In office XP, they are indicated by a <b class="ui"> tag.
5. If we look 3 words on either side of the tag stopping when we see commas or semicolons and scan for words or phrases like "click," "double-click," "select," "unselect," "check," etc., these a very good indication of the action to be performed on the menu item can be determined. Similarly, words or phrases like "menu item," "button," "tab," etc. give a good indication of the type of UI element.
6. For each <b> tag in a step look for a triple of the form <action, text on the UT, type of UI element>. These will then be transformed into the actions for each step. (ActionRefs in the MAML or ACW XML schema).
7. Bulleted lists at the end of the procedure tend to represent notes.
8. Nested numbered lists correspond to subtasks.

While these heuristics don't work at 100% accuracy, they still enable most of the translation to the ACW XML format, and only need corrections to the ACW from the author instead of a re-write.

An example of a multi-step conversion of an HTML content file to an ACW XML schema or format is provided as follows:

Example of an HTML format file:

```
<HTML DIR="LTR">
<HEAD>
<META NAME="MS-IT-LOC" CONTENT="Mouse">
<META NAME="MS.LOCALE" CONTENT="EN-US">
<SCRIPT LANGUAGE="JScript" SRC="MS-ITS:ntshared.chm::/shared.js"></SCRIPT>
<META HTTP-EQUIV="Content-Type" CONTENT="text/html; charset=Windows-1252">
<META HTTP-EQUIV="MSThemeCompatible" CONTENT="Yes">
<TITLE>Reverse your mouse buttons</TITLE>
```

-continued

```
<META NAME="MS-HAID" CONTENT="a_win_reverse_mouse_buttons">
<LINK REL="stylesheet" MEDIA="screen" TYPE="text/css" HREF="MS-
ITS:ntshared.chm::/coUA.css">
<LINK REL="stylesheet" MEDIA="print" TYPE="text/css" HREF="MS-
ITS:ntshared.chm::/coUAprint.css">
</HEAD>
<BODY>
<DIV CLASS="Uabrand"><SPAN CLASS="WebOnly"><IMG SRC="MS-
ITS:ntdef.chm::/Uabrand.gif" CLASS="Uabrand" ALT="Microsoft Windows
graphic"></SPAN></DIV>
<P CLASS="PROCLABEL">
<A NAME="win_reverse_mouse_buttons">To reverse your mouse buttons</A></P>
<OL>
<LI>Open <A ID="shortcut" HREF="EXEC=,rundll32.exe,shell32.dll,Control_RunDLL
main.cpl CHM=ntshared.chm FILE=alt_url_windows_component.htm">Mouse</A> in
Control Panel.</LI>
<LI>On the <B>Buttons</B> tab, under <B>Button configuration</B>, select the
<B>Switch primary and secondary buttons</B> check box to make the right button the
primary mouse button. Clear the check box if you want the left button to be the primary
mouse button. </LI>
</OL>
<P CLASS="note">Notes</P>
<UL>
<LI><NOLOC><SPAN CLASS="smart" ID="mousecp">XOX</SPAN></NOLOC></LI>
<LI>Be aware that if you switch the mouse buttons using the left mouse button, you will
have to use the right mouse button to switch them back.</LI>
</UL>
<P><A ID="relTopics" HREF="CHM=mouse.chm;folderop.chm
META=a_win_mouse_buttons;a_win_double_click;a_folderopt_change_mouse_clicks"
>Related Topics</A></P>
</BODY>
</HTML>
```

In a first step of this conversion, the HTML document is converted to XHTML with the results as shown:

```
<?xml version="1.0" encoding="utf-8"?>
<html dir="LTR">
    <head>
        <meta content="Mouse" name="MS-IT-LOC" />
        <meta content="EN-US" name="MS.LOCALE" />
        <script language="JScript" src="MS-ITS:ntshared.chm::/shared.js" />
        <meta content="text/html; charset=Windows-1252" http-equiv="Content-Type" />
        <meta content="Yes" http-equiv="MSThemeCompatible" />
        <title>Reverse your mouse buttons</title>
        <meta content="a_win_reverse_mouse_buttons" name="MS-HAID" />
        <link href="MS-ITS:ntshared.chm::/coUA.css" rel="stylesheet" type="text/css"
media="screen" />
        <link href="MS-ITS:ntshared.chm::/coUAprint.css" rel="stylesheet" type="text/css"
media="print" />
    </head>
    <body>
        <div class="Uabrand">
            <span class="WebOnly">
                <img alt="Microsoft Windows graphic" src="MS-ITS:ntdef.chm::/Uabrand.gif"
class="Uabrand" />
            </span>
        </div>
        <p class="PROCLABEL" />
        <a name="win_reverse_mouse_buttons">To reverse your mouse buttons</a>
        <ol>
            <li>Open <a href="EXEC=,rundll32.exe,shell32.dll,Control_RunDLL main.cpl
CHM=ntshared.chm FILE=alt_url_windows_component.htm" id="shortcut">Mouse</a>
in Control Panel.</li>
            <li>On the <b>Buttons</b> tab, under <b>Button configuration</b>, select the
<b>Switch primary and secondary buttons</b> check box to make the right button the
primary mouse button. Clear the check box if you want the left button to be the primary
mouse button.</li>
        </ol>
        <p class="note" />Notes<ul><li><noloc><span id="mousecp"
class="smart">XOX</span></noloc></li><li>Be aware that if you switch the mouse
buttons using the left mouse button, you will have to use the right mouse button to
switch them back.</li></ul><p /><a href="CHM=mouse.chm;folderop.chm
```

```
META=a_win_mouse_buttons;a_win_double_click;a_folderopt_change_mouse_clicks"
id="relTopics">Related Topics</a></body>
</html>
```

Then a parser converts it to an XML format that is used by ACW, with a result as shown:

```
<?xml version="1.0" encoding="utf-8"?>
<task contentType="ACWProcedure"
xmlns="http://schemas.microsoft.com/maml/2003/5">
    <title>Reverse your mouse buttons</title>
    <procedure>
        <step>
            <shortcut>
                <para>Open <doTask>Mouse</doTask> in
                Control Panel.</para>
            </shortcut>
        </step>
        <step>
            <uiActions>
                <actionRef Id="0" />
                <actionRef Id="1" />
                <description>
                    <para>On the <ui>Buttons</ui> tab, under
                    Button configuration, select the
<ui>Switch primary and secondary buttons</ui> check box to
make the right button the
primary mouse button. Clear the check box if you want the left
button to be the primary
mouse button.</para>
                </description>
            </uiActions>
        </step>
```

```
        </procedure>
        <taskExecutionBlock>
            <uiAction Id="2">
                <actionHints>
                    <actionType>SELECT</actionType>
                    <uiText>Switch primary and secondary
                    buttons</uiText>
                    <uiElement>CHECKBOX</uiElement>
                </actionHints>
            </uiAction>
            <uiAction Id="1">
                <actionHints>
                    <actionType>NONE</actionType>
                    <uiText>Buttons</uiText>
                    <uiElement>TAB</uiElement>
                </actionHints>
            </uiAction>
        </taskExecutionBlock>
</task>
```

In a last step, the taskExecution block is replaced with real properties of the ACW script by an ACW script generator 562 (shown in FIG. 6) to produce an ACW script file 564. This is described further below with reference to steps shown at blocks 504 and 506 of FIG. 5, but for this example, the results are first shown as:

```
<?xml version="1.0" encoding="utf-8"?>
<task contentType="ACWProcedure"
xmlns="http://schemas.microsoft.com/maml/2003/5">
    <title>Reverse your mouse buttons</title>
    <procedure>
        <step>
            <shortcut>
                <para>Open <doTask>Mouse</doTask> in Control Panel.</para>
            </shortcut>
        </step>
        <step>
            <uiActions>
                <actionRef Id="0" />
                <actionRef Id="1" />
                <description>
                    <para>On the <ui>Buttons</ui> tab, under Button configuration, select the
<ui>Switch primary and secondary buttons</ui> check box to make the right button the
primary mouse button. Clear the check box if you want the left button to be the primary
mouse button.</para>
                </description>
            </uiActions>
        </step>
    </procedure>
    <taskExecutionBlock>
        <uiAction id="1" hasNoSideEffects="false">
            <uiActionDescription />
            <executionMethods>
                <controlPatternAction>
                    <controlPattern>Invoke</controlPattern>
                </controlPatternAction>
                <mouseAction>
                    <clickType>Click</clickType>
                    <mouseButton>Left</mouseButton>
                    <mouseKey>None</mouseKey>
```

-continued

```
                </mouseAction>
            </executionMethods>
            <uiElement>
                <properties>
                    <persistentId
isLocaleIndependent="false">PageTab:Buttons:1:SysTabControl32:Switch</persistentId>
                    <name>Buttons</name>
                    <className>SysTabControl32</className>
                    <controlType>B:TabItem</controlType>
                    <numChildren>0</numChildren>
                    <providerId>I:Invoke</providerId>
                    <elementId />
<boundingRectangle>{X=121,Y=183,Width=48,Height=18}</boundingRectangle>
                </properties>
                <topLevelWindow>
                    <windowProperties>
                        <persistentId
isLocaleIndependent="false">Dialog:0:#32770:OK</persistentId>
                        <name>Mouse Properties</name>
                        <className>#32770</className>
                        <controlType>B:Custom</controlType>
                        <numChildren>5</numChildren>
                        <providerId />
                        <elementId />
<boundingRectangle>{X=113,Y=174,Width=398,Height=423}</boundingRectangle>
                        <isModal>False</isModal>
                        <moduleName />
                    </windowProperties>
                    <processName>rundll32</processName>
                </topLevelWindow>
                <pathToTopLevelWindow>
                    <elementAncestor>
                        <persistentId
isLocaleIndependent="false">Window:rundll32:SysTabControl32:012320</persistentId>
                        <name>Unlabeled element</name>
                        <className>SysTabControl32</className>
                        <controlType>B:Custom</controlType>
                        <numChildren>1</numChildren>
                        <providerId />
                        <elementId />
<boundingRectangle>{X=119,Y=181,Width=386,Height=380}</boundingRectangle>
                    </elementAncestor>
                    <elementAncestor>
                        <persistentId
isLocaleIndependent="false">PageTabList:0:SysTabControl32</persistentId>
                        <name>Unlabeled element</name>
                        <className>SysTabControl32</className>
                        <controlType>B:Tab</controlType>
                        <numChildren>5</numChildren>
                        <providerId />
                        <elementId />
<boundingRectangle>{X=119,Y=181,Width=386,Height=380}</boundingRectangle>
                    </elementAncestor>
                </pathToTopLevelWindow>
            </uiElement>
        </uiAction>
        <uiAction id="0" hasNoSideEffects="false">
            <uiActionDescription />
            <executionMethods>
                <mouseAction>
                    <clickType>Click</clickType>
                    <mouseButton>Left</mouseButton>
                    <mouseKey>None</mouseKey>
                </mouseAction>
            </executionMethods>
            <uiElement>
                <properties>
                    <persistentId isLocaleIndependent="false">CheckButton:Switch primary
and secondary
buttons:0:Button:Alt+s:Check</persistentId>
                    <name>Switch primary and secondary buttons</name>
                    <className>Button</className>
                    <controlType>B:CheckBox</controlType>
                    <numChildren>0</numChildren>
                    <providerId>I:Toggle</providerId>
                    <elementId />
```

-continued

```
<boundingRectangle>{X=143,Y=231,Width=209,Height=23}</boundingRectangle>
            </properties>
            <topLevelWindow>
                <windowProperties>
                    <persistentId
isLocaleIndependent="false">Dialog:0:#32770:OK</persistentId>
                    <name>Mouse Properties</name>
                    <className>#32770</className>
                    <controlType>B:Custom</controlType>
                    <numChildren>5</numChildren>
                    <providerId />
                    <elementId />
    <boundingRectangle>{X=113,Y=174,Width=398,Height=423}</boundingRectangle>
                    <isModal>False</isModal>
                    <moduleName />
                </windowProperties>
                <processName>rundll32</processName>
            </topLevelWindow>
            <pathToTopLevelWindow>
                <elementAncestor>
                    <persistentId
isLocaleIndependent="false">Window:rundll32:#32770:0</persistentId>
                    <name>Buttons</name>
                    <className>#32770</className>
                    <controlType>B:Custom</controlType>
                    <numChildren>1</numChildren>
                    <providerId />
                    <elementId />
<boundingRectangle>{X=123,Y=203,Width=378,Height=354}</boundingRectangle>
                </elementAncestor>
                <elementAncestor>
                    <persistentId
isLocaleIndependent="false">PropertyPage:0:#32770</persistentId>
                    <name>Buttons</name>
                    <className>#32770</className>
                    <controlType>B:Custom</controlType>
                    <numChildren>15</numChildren>
                    <providerId />
                    <elementId />
<boundingRectangle>{X=123,Y=203,Width=378,Height=354}</boundingRectangle>
                </elementAncestor>
                <elementAncestor>
                    <persistentId
isLocaleIndependent="false">Window:rundll32:Button:0101</persistentId>
                    <name>Switch primary and secondary buttons</name>
                    <className>Button</className>
                    <controlType>B:Custom</controlType>
                    <numChildren>1</numChildren>
                    <providerId />
                    <elementId />
<boundingRectangle>{X=143,Y=231,Width=209,Height=23}</boundingRectangle>
                </elementAncestor>
            </pathToTopLevelWindow>
        </uiElement>
    </uiAction>
  </taskExecutionBlock>
</task>
```

Referring back for the moment to FIG. 5, shown at block 504 is the step of recording UIs of application(s) in order to create a UI elements file or database. To implement this step, a window recorder tool 558 (shown in FIGS. 6 and 7) is used. Window recorder 558 functions similarly to task recorder 402 shown in FIG. 4, except that it uses the same methods and functionality to record every element of a Window of UI 205. The user of window recorder 558 can open every relevant dialog box/window in a particular application, and run the window recorder on that window. The window recorder allows the user to select a part of the window or the whole one. As will be illustrated in greater detail below, the window recorder tool 558 stores information about all the elements found on the window in a file or database 560. In addition to the properties needed for playback, the window recorder tool also captures the image of each element.

Figure 7:
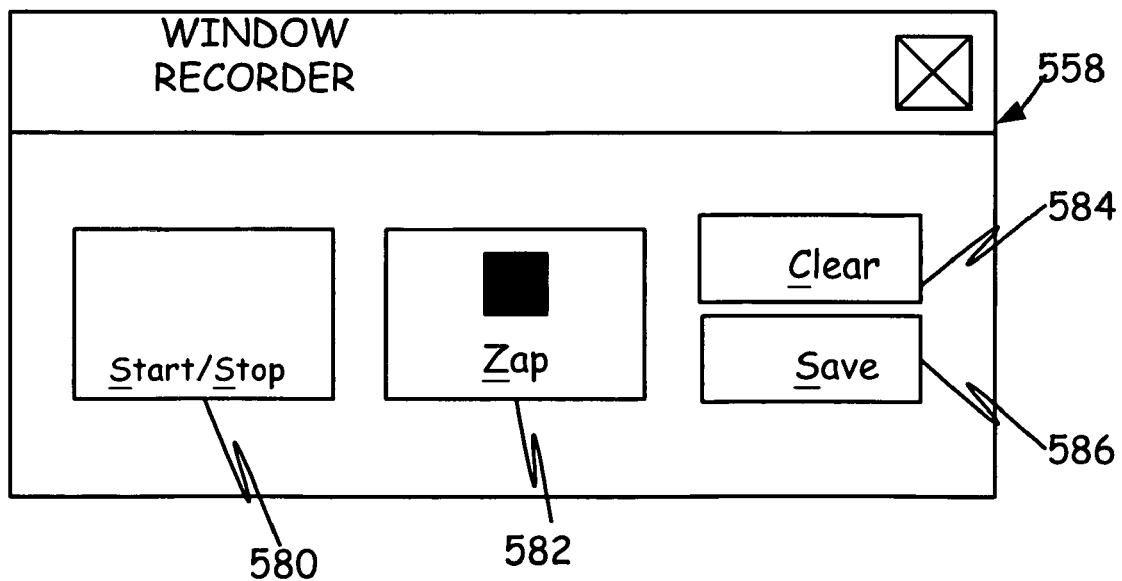
FIG. 7 is a diagrammatic illustration of a control for a window recording component.

In one example embodiment illustrated in FIG. 7, window recorder 558 includes a "Start/Stop" button 580 used to start or stop the recording process. The recording process is started, for example, by defining a window on the UI to record. A "Zap" button 582 is also included which, when clicked upon, begins the process of recording UI elements (and their properties) in the window established by the user. This is illustrated in greater detail below. To stop the recording process, "Start/Stop" button 580 is again clicked. To clear the contents of the window recorder memory, "Clear" button 584 is included. To save the information recorded from a window, "Save" button 586 is clicked.

Figure 8:
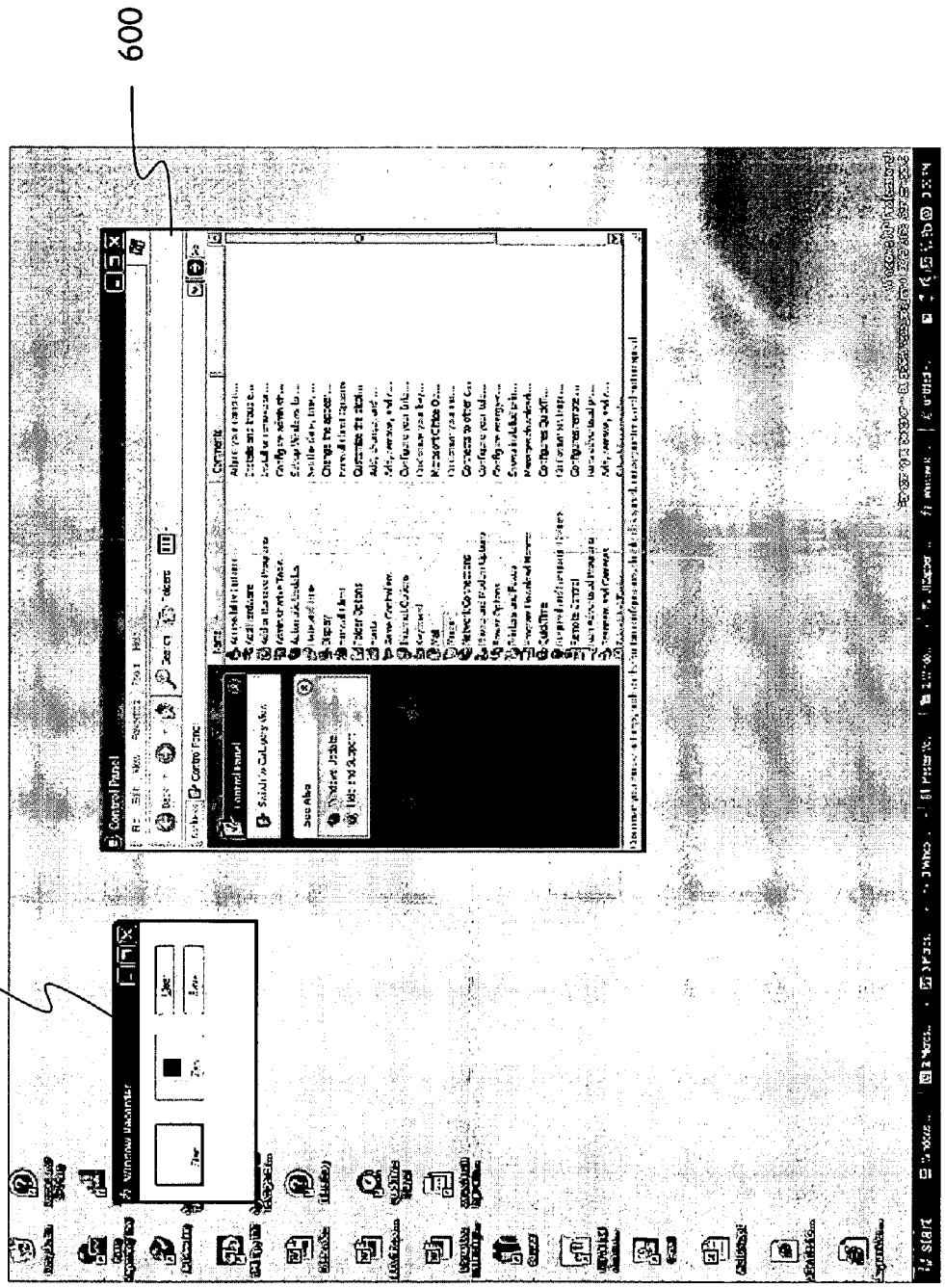
FIGS. 8-10 are screen shots illustrating operation of the window recording component of FIG. 7.
Figure 9:
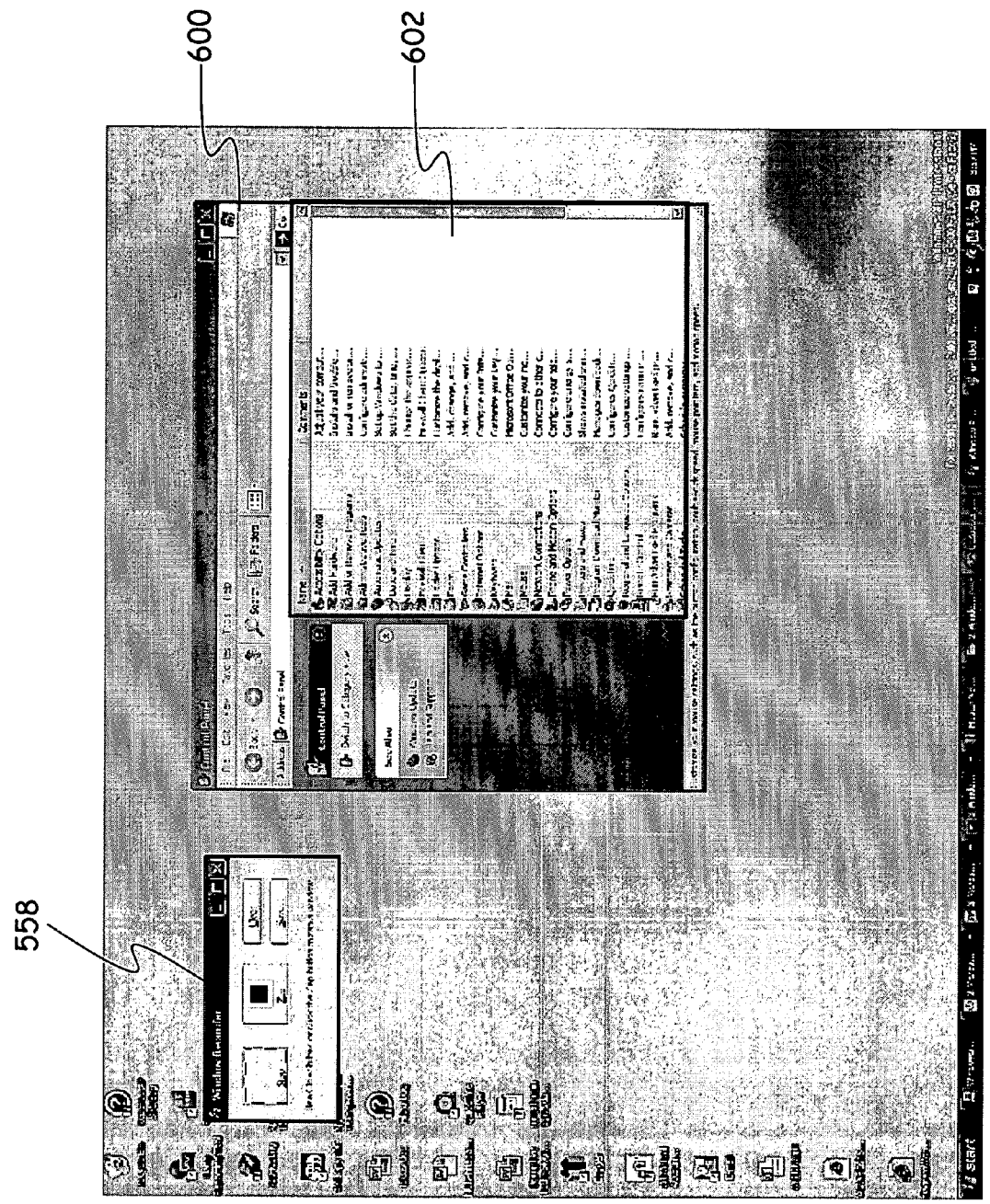
Figure 10:
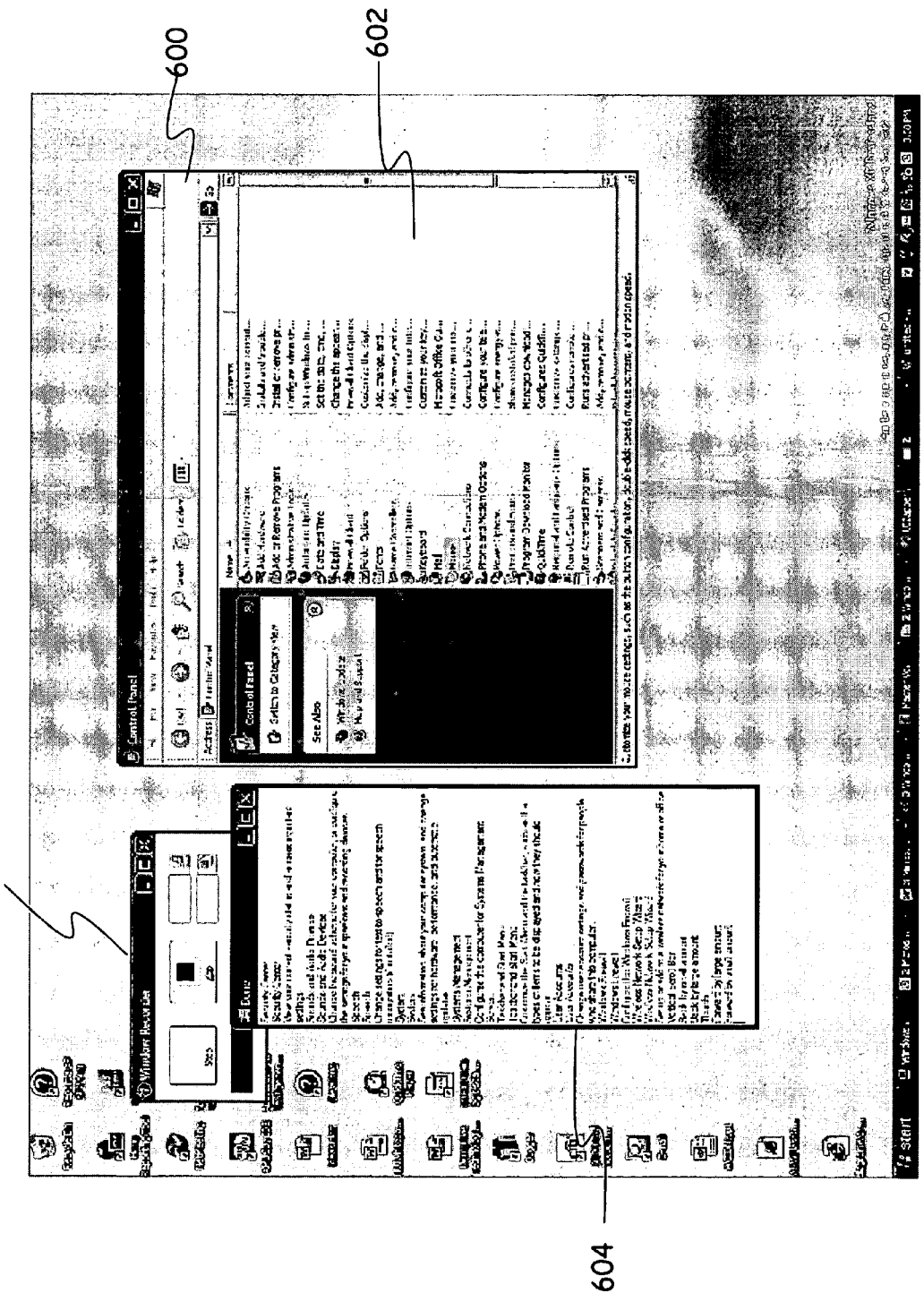

Referring now to the screen shots of FIGS. 8-10, use of the windows recorder tool 558 to record entire windows is shown. In FIG. 8, a control panel UI 600 is shown, along with recorder tool 558. Once the "Start/Stop" button 580 is clicked, as the user moves the pointer (using an input device such as a mouse), a rectangle is drawn on the screen as shown in FIG. 9. The rectangle corresponds to a window 602 in which the cursor is positioned. In the illustrated example, the window 602 corresponds to the listed UI element and other contents of the Control Panel.

Once window 602 is defined, the user clicks on Zap key 582 (or presses one or more defined hot keys such as <Ctrl><Shift><z>), and recorder 558 records every element in that particular window 602. In recording every element of the window, recorder 558 also extracts the properties of interest of every element of that window, along with the image or graphic for that element.

Referring next to FIG. 10, shown is a recorded or zapped window 604 which is displayed, showing the user the text of every element recorded from window 602. The contents of window 604 can be saved using button 586. This process takes little time, and is repeated for each relevant window of an application, storing all of the controls in a file or database 564.

Referring back to FIGS. 5 and 6, shown at block 506 in FIG. 5 is a final step of creating ACW scripts from the converted files 556 (step 502) and from the UI elements file or database 560 (created in step 504). This adds the properties that are required by the runtime engine to playback the script. Using the converted scripts 556 and all the relevant UI elements (from file or database 560) from the application recorded using the window recorder tool 558, a third tool combines this information to create the ACW script 564. This is illustrated as ACW script generator 562 in FIG. 6. This tool opens each converted script serially. Then for each actionRef element in the converted scripts 556, i.e., the (action, text, menu element) pair, it looks for a corresponding match in the file/database 560. In cases where there is more than one match, the tool shows the user the images of the corresponding matches and lets the author specify the correct one. The converted ACW scripts can then be tested to confirm the conversion, and edited by the author as needed.

Although the present invention has been described with reference to particular embodiments, workers skilled in the art will recognize that changes may be made in form and detail without departing from the spirit and scope of the invention.

What is claimed is:

1. A computer implemented method of converting existing help content files into an active content wizard executable file, the method comprising:
   using a processor to convert an existing help content file in a HyperText Markup Language (HTML) format into a corresponding file in an active content wizard Extensible Markup Language (XML) schema format by using heuristic criteria based upon style guidelines of help content to map the existing content file from the HTML format to the XML format;
   creating a database of user interface elements by recording user interface elements and corresponding properties from one or more windows of an application program to which the existing content file corresponds;
   using the processor to access the database of user interface elements in order to retrieve information relating to user interface elements referenced in the corresponding file in the active content wizard schema; and
   using the processor to create an active content wizard file from the corresponding file in the active content wizard schema and the retrieved information relating to user interface elements.

2. The computer implemented method of claim 1, wherein the existing content file is in a first XML format, and wherein the active content wizard schema is a second XML format, the step of converting the existing content file into the corresponding file in the active content wizard schema further comprising using a style sheet to convert the existing content file from the first XML format to the second XML format.

3. The computer implemented method of claim 1, wherein the step of converting the existing content file into the corresponding file in the active content wizard schema further comprises performing a multi-step conversion of the existing content file from the HTML format to the XML format.

4. The computer implemented method of claim 3, wherein performing the multi-step conversion of the existing content file from the HTML format to the XML format comprises:
   converting the existing content file in the HTML format to a corresponding file in an XHTML format; and
   converting the corresponding file in the XHTML format to the corresponding file in the XML format.

5. A system for converting existing content files into an active content wizard executable file, the system comprising:
   a processor;
   a computer storage medium having stored thereon computer executable instructions for configuring the processor to implement system components comprising:
      a conversion component configured to convert an existing help content file into a corresponding file in an active content wizard schema by searching the existing help content file using the plurality of heuristic criteria;
      a database of user interface elements corresponding to user interface elements recorded from one or more windows of an application program to which the existing content file corresponds;
      a window recorder component configured to record the user interface elements and corresponding properties from the one or more windows of the application program to which the existing content file corresponds, and to store the user interface elements and corresponding properties in the database; and
      an active content script generator configured to create an active content wizard file from the corresponding file in the active content wizard schema and from the user interface elements in the database.

6. The system of claim 5, wherein the existing content file is in an HTML format, and wherein the active content wizard schema is an XML format, wherein the conversion component is configured to convert the existing content file into the corresponding file in the active content wizard schema using the heuristic criteria to map the existing content file from the HTML format to the XML format.

7. The system of claim 6, wherein the conversion component is further configured to convert the existing content file into the corresponding file in the active content wizard schema by performing a multi-step conversion of the existing content file from the HTML format to the XML format.

8. The system of claim 7, wherein the conversion component is configured to perform the multi-step conversion of the existing content file from the HTML format to the XML format by first converting the existing content file in the HTML format to a corresponding file in an XHTML format, and then by converting the corresponding file in the XHTML format to the corresponding file in the XML format.

9. The system of claim 5, wherein the existing content file is in a first XML format, and wherein the active content wizard schema is a second XML format, the conversion component being configured to convert the existing content file into the corresponding file in the active content wizard schema using a style sheet to convert the existing content file from the first XML format to the second XML format.

10. The system of claim 5, wherein the conversion component is configured to convert the existing content file into the corresponding file in the active content wizard schema by performing a multi-step conversion.

11. A computer implemented method of converting existing content files into an active content wizard executable file, the method comprising:

using a processor to convert an existing help content file into a corresponding file in an active content wizard schema by searching the existing help content file using a plurality of heuristic criteria based upon style guidelines of help content and using the plurality of heuristic criteria to map the existing help content file into the active content wizard schema;

using the processor to create a database of user interface elements by recording the user interface elements and corresponding properties from one or more windows of an application program to which the existing content file corresponds;

using the processor to retrieve information relating to user interface elements referenced in the corresponding file in the active content wizard schema from the database; and using the processor to create an active content wizard file from the corresponding file in the active content wizard schema and the retrieved information relating to user interface elements.

12. The computer implemented method of claim 11, wherein recording the user interface elements and corresponding properties from the one or more windows of the application program to which the existing content file corresponds further comprises:

identifying a window in the application program; and using a window recorder to automatically record a plurality of user interface elements shown in the identified window, along with corresponding properties for the plurality of user interface elements.

* * * * *